US008381555B2

(12) United States Patent
Takahashi et al.

(10) Patent No.: US 8,381,555 B2
(45) Date of Patent: Feb. 26, 2013

(54) CUTTING DEVICE, MACHINING METHOD, AND DIE MACHINED BY THE MACHINING METHOD

(75) Inventors: Masayuki Takahashi, Osaka (JP); Isao Tashiro, Osaka (JP)

(73) Assignee: Panasonic Corporation, Osaka (JP)

( * ) Notice: Subject to any disclaimer, the term of this patent is extended or adjusted under 35 U.S.C. 154(b) by 474 days.

(21) Appl. No.: 12/402,598

(22) Filed: Mar. 12, 2009

(65) Prior Publication Data

US 2009/0240367 A1   Sep. 24, 2009

(30) Foreign Application Priority Data

Mar. 19, 2008 (JP) .................................. 2008-070992
Feb. 5, 2009 (JP) .................................. 2009-024361

(51) Int. Cl.
G05B 19/402   (2006.01)

(52) U.S. Cl. ........................... 70/160; 700/172; 700/192

(58) Field of Classification Search ........................ None
See application file for complete search history.

(56) References Cited

U.S. PATENT DOCUMENTS

| 6,776,563 | B2 * | 8/2004 | Shamoto et al. | 409/293 |
|---|---|---|---|---|
| 7,248,428 | B2 * | 7/2007 | Kim et al. | 360/78.06 |
| 7,328,638 | B2 * | 2/2008 | Gardiner et al. | 82/123 |
| 7,515,329 | B2 * | 4/2009 | Sprague et al. | 359/292 |
| 7,942,063 | B2 * | 5/2011 | Gao et al. | 73/760 |
| 2007/0276534 | A1 | 11/2007 | Takahashi et al. | 700/193 |

FOREIGN PATENT DOCUMENTS

EP   1 234 627   8/2002

OTHER PUBLICATIONS

Yang, Chen, Cheng, "Design and Control of a Piezo-based Fast Tool Servo System for Precision Diamond Turning", Key Engineering Materials vol. 339, pp. 195-199, 2007.*
Tripathi, Shantanu and Dornfeld, D. A., Review of Geometric Solutions for Milling Burr Prediction and Minimization, Research Reports 2003/2004 for Laboratory for Manufacturing Automation, University of California, Berkley, pp. 21-30.*
Litwinski, Min, Lee, Dornfeld, Lee, "Scalability of Tool Path Planning to Micro Machining", Laboratory for Manufacturing and Sustainability, University of California, Berkley, Sep. 1, 2006.*
Devasia, Eleftheriou, Moheimani, "A Survey of Control Issues in Nanopositioning", IEEE Transactions on Control Systems Technology, vol. 15, No. 5, pp. 802-822, 2007.*
Bhushan, Bharat, Handbook of Micro/Nano Tribology, 2nd Edition, CRC Press, New York, 1999, chapter 7.*

(Continued)

Primary Examiner — Kakali Chaki
Assistant Examiner — Walter Hanchak
(74) Attorney, Agent, or Firm — Steptoe & Johnson LLP

(57) ABSTRACT

A cutting device is provided which can simultaneously achieve a shorter machining time, lower machining resistance during cutting, and high-precision machining. To be specific, the cutting device of the present invention includes a three-axis tool unit including a first actuator operating in a u direction, a second actuator operating in a v direction orthogonal to the u direction, a third actuator operating in a w direction orthogonal to the u direction and the v direction, a tool holder disposed at the intersection of the u direction, the v direction, and the w direction, a tool mounted in the tool holder, and three sensors for measuring the displacements of the first, second, and third actuators, respectively and feeding back displacement signals representing the measured displacements, wherein the first, second, and third actuators of the three-axis tool unit vibrate so as to perform vibration cutting on a work material.

13 Claims, 17 Drawing Sheets

OTHER PUBLICATIONS

NTN Technical Review No. 72: Moriwaki, Toshimichi, Trends in Recent Machine Tool Technologies, NTN Corporation, Osaka, JP, 2006, pp. 1-7.*

Yang, Chen, Cheng, "Design and Control of a Piezo-based Fast Tool Servo System for Precsion Diamond Turning", Key Engineering Materials, vol. 339, 2007, pp. 195-199,.*

Tripathi, Shantanu and Dornfield, D. A., "Review of Geometric Solutions for Milling Burr Prediction and Minimization", Research Reports 2003/2004 for Laborator for Manufacturing Automation, University of California, Berkley, pp. 21-30.*

Litwinski, Min, Lee, Dornfield, Lee, "Scalability of Tool Path Planning to Micro Machining", Laboratory for Manufacturing and Sustainability, University of California, Berkley, Sep. 1, 2006.*

Devasia, Eleftheriou and Moheimani, "A Survey of Control Issues in Nanopositioning", IEEE Transactions on Control Systems Technology, vol. 15, No. 5, 2007, pp. 802-823.*

JSPE, "Introduction of Awards for 2007", JSPE Bulletin, Jan. 2008 pp. 1-2, from "http://www.jspe.or.jp/english/topics/PE/33-1.pdf".*

Kim and Loh, "An ultrasonic elliptical vibration cutting device for micro V-groove machining: Kinematical analysis and micro V-groove machining characteristics", Journal of Materials Processing Technology, vol. 190, 2007, pp. 181-188.*

Kutin, Smrecnik, Bajsic, "Phase-Locking of the Coriolis meter's resonance frequency based on virtual instrumentation," Sensors and Actuators A, vol. 104, 2003, pp. 86-93 downloaded from sciencedirect.com: http://144.206.159.178/FT/943/86032/1454160.pdf.*

Okazaki, Y., "Fast Tool Servo," Seimitsu Kogaku Kaishi (Journal of the Japan Society for Precision Engineering), vol. 72, No. 4, 2006, pp. 422-426.

* cited by examiner

CUTTING DEVICE, MACHINING METHOD, AND DIE MACHINED BY THE MACHINING METHOD

FIELD OF THE INVENTION

The present invention relates to a cutting device which can minutely operate a tool independently in three axial directions, a machining method, and a die machined by the machining method.

BACKGROUND OF THE INVENTION

In the prior art, a technique called Fast Tool Servo has been known. In Fast Tool Servo, actuators for supporting tools are driven at high speeds at frequencies many times higher than the response frequencies of the tables (movable axes) of a processing machine. The actuators are driven on the order of several hundreds hertz and include a piezoelectric element, a magnetostrictor, and a voice coil which can be operated at high speeds. Although it is difficult to operate the heavy tables of the processing machine at high speeds, it is relatively easy to minutely displace only the tools at high speeds by the actuators which can be operated at high speeds.

Fast Tool Servo is described in, for example, "Japanese Patent Laid-Open No. 2007-75915", "Japanese Patent Laid-Open No. 2007-307663", and "Fast Tool Servo, Yuichi Okazaki, Journal of the Japan Society for Precision Engineering, the Japan Society for Precision Engineering, 2006, Vol. 72, No. 4, pp. 422-426".

FIG. 18 is a typical structural diagram showing a cutting device for realizing Fast Tool Servo. FIG. 19 is a typical control block diagram of the cutting device for realizing Fast Tool Servo.

As shown in FIG. 18, the operating directions (axial directions) of an actuator 101, an actuator 102, and an actuator 103 are orthogonal to one another. A tool holder 104 is disposed at the intersection of the three axial directions. The tool holder 104 has a tool 105 attached thereon. Displacement sensors 106a, 106b, and 106c measure the displacements of sensor targets 107a, 107b, and 107c attached to the tool holder 104, and generate displacement sensor signals representing the measured displacements. These displacement sensor signals represent the translational displacements of the actuators 101, 102, and 103.

The driving of the three-axis actuators 101, 102, and 103, that is, the displacements of the actuators are controlled by a controller 111 shown in FIG. 19. As shown in FIG. 19, the controller 111 is fed with position information (X coordinate, Y coordinate, Z coordinate, and B coordinate) from an ultraprecision machine (not shown). Based on the position information from the ultraprecision machine, a real-time target value arithmetic section 112 provided in the controller 111 calculates the target displacements (command values) of the three-axis actuators 101, 102, and 103. According to the command values, actuator driving amplifiers 113a, 113b, and 113c drive the actuators 101, 102, and 103. The displacement sensor signals from the displacement sensors 106a, 106b, and 106c mounted respectively on the actuators 101, 102, and 103 are inputted to the respective feedback systems of the three axes. In other words, the driving, that is, the displacement of each of the three-axis actuators 101, 102, and 103 is feedback controlled.

The following will describe the operations of the cutting device configured thus. During machining, the movable axes (X axis, Y axis, Z axis, and B axis) of the ultraprecision machine are operated based on the NC data of the ultraprecision machine, and the tool 105 minutely operated according to the command values generated based on the position information from the ultraprecision machine has a cutting edge coming into contact with a work material 108 rotating about the B axis, so that the work material 108 is machined.

The cutting device for realizing Fast Tool Servo makes it possible to minutely displace the cutting edge of the tool at high speeds, and machine a nonaxisymmetric aspheric surface (free-form surface) as if the nonaxisymmetric aspheric surface was lathed. Thus it is possible to dramatically shorten the machining time of the nonaxisymmetric aspheric surface (free-form surface).

In a typical cutting device for realizing Fast Tool Servo, however, cutting is performed in synchronization with the position coordinate (B coordinate) of a rotation axis (B axis) and the position coordinate of one of the X axis and the Y axis (one of the X coordinate and the Y coordinate) and thus causes large machining resistance as in ordinary lathing. The large machining resistance causes an elastic deformation on the actuators which support the tool. The elastic deformation on the actuators results in an error of a machined shape. Thus a typical cutting device for realizing Fast Tool Servo cannot achieve machining with higher precision.

Further, in a typical cutting device for realizing Fast Tool Servo, actuators have to be driven at frequencies not higher than the response speed of a feedback control system. To be specific, for example, in a cutting device described in "Japanese Patent Laid-Open No. 2007-75915", an actuator has a driving frequency of about 1 kHz. Thus the rotation speed (cutting speed) of the B axis has to be set at about 100 rpm or less, though the rotation speed varies with the machining position. Generally, in lathing, machining resistance increases as a rotation speed decreases. Thus when the rotation speed is reduced, it is not possible to perform high-precision machining.

Another machining technique is called elliptical vibration cutting. In elliptical vibration cutting, vibration components are applied to a tool in two directions, the cutting edge of the tool is minutely operated according to an elliptical shape by optimally controlling a phase difference between the vibration components in the two directions, and a work material is cut by the cutting edge of the tool which is minutely operated according to the elliptical shape. This machining technique can dramatically reduce machining resistance, so that it is expected that chipping can be prevented on the tool and the life of the tool can be increased.

Elliptical vibration cutting is described in, for example, "Japanese Patent No. 3500434" and "Japanese Patent No. 3806603".

In a typical vibration cutting device for realizing elliptical vibration cutting, however, the machining resistance can be reduced but the machining time cannot be shortened.

Although a combination of Fast Tool Servo and elliptical vibration cutting has been demanded, these techniques use completely different frequency bands in control and thus cannot be combined.

To be specific, Fast Tool Servo uses a frequency of about 1 kHz or less in control. This is because an increase in used frequency band causes a phase delay and high machining accuracy cannot be obtained. Moreover, an increase in used frequency band may cause oscillation and the like.

On the other hand, elliptical vibration cutting uses a frequency higher than 1 kHz in control. Although elliptical vibration cutting can be performed at 1 kHz or less, the machining speed is reduced and thus a frequency of 1 kHz or less is not used in the industry.

The vibration cutting device can control the number of vibrations and an amplitude but cannot control the absolute position of the cutting edge of a tool. Thus unfortunately, elliptical vibration cutting cannot obtain high accuracy of form in a long machining time. This is because when the machining time increases, the absolute position of the cutting edge of the tool is changed by a change in machining atmosphere, for example, a temperature change. For example, when machining is performed by elliptical vibration cutting over several hours as in the machining of a mold master of a light guide plate, high machining accuracy cannot be obtained.

DISCLOSURE OF THE INVENTION

In view of the problems of the prior art, an object of the present invention is to provide a cutting device and a machining method which can shorten a machining time, reduce machining resistance during cutting, and achieve high-precision machining at the same time. Another object of the present invention is to provide a die machined by the machining method.

In order to attain the object, a cutting device of the present invention includes:

a three-axis tool unit including:

a first actuator operating in a u direction;

a second actuator operating in a v direction orthogonal to the u direction;

a third actuator operating in a w direction orthogonal to the u direction and the v direction;

a tool holder disposed at the intersection of the u direction, the v direction, and the w direction;

a tool mounted in the tool holder; and three sensors for measuring the displacements of the first, second, and third actuators, respectively and feeding back displacement signals representing the measured displacements; and an arithmetic section for generating command values for the first, second, and third actuators, respectively, the first, second, and third actuators performing operations independently controlled based on the command values generated by the arithmetic section and the displacement signals having been fed back from the three sensors, wherein the first, second, and third actuators vibrate so as to perform vibration cutting on a work material.

With the cutting device, it is possible to perform vibration cutting using the three-axis unit capable of three-dimensionally operating the tool, which moves relative to the work material, at high speeds, thereby simultaneously achieving a shorter machining time, lower machining resistance during cutting, and high-precision machining.

The cutting device may include three arbitrary waveform generators which are simultaneously controlled and generate waveforms for independently vibrating the first, second, and third actuators, and three arbitrary waveform input devices which are disposed between the arithmetic section and the first, second, and third actuators and are fed with the waveforms generated by the three arbitrary waveform generators. The three arbitrary waveform input devices may be disposed before three amplifiers for driving the first, second, and third actuators, respectively. Further, feedback systems to which the displacement signals are fed back from the three sensors may include notch filters. The provision of the notch filters makes it possible to more precisely control the vibrations of the actuators.

Further, the arithmetic section may generate waveform values for independently vibrating the first, second, and third actuators and add the generated waveform values to the command values.

Moreover, the arithmetic section may generate the command values for the first, second, and third actuators so as to compensate for the displacement of the cutting edge of the tool from a predetermined position, the displacement being caused by the deviations of the movable axes of an ultraprecision machine including the three-axis tool unit. By compensating for the displacement of the cutting edge of the tool thus, it is possible to achieve machining with higher precision.

A machining method of the present invention forms a blind groove on a work material by causing a tool to enter the work material and then retracting the tool from the work material, the method including the step of: controlling, when the blind groove is formed, the cutting edge of the tool to a predetermined position so as to compensate for a displacement of the cutting edge of the tool from the predetermined position while vibrating the tool so as to perform vibration cutting on the work material, the displacement being caused by the deviations of the movable axes of an ultraprecision machine including a three-axis tool unit having the tool attached thereon.

This machining method can reduce machining resistance during cutting, and form the blind groove with high accuracy of form in a short time.

Further, the tool may enter the work material at an angle smaller than 90° and the tool may retract from the work material at an angle larger than 90°. Thus it is possible to form the blind groove without generating burrs with high accuracy of form in a short time.

A die of the present invention has the blind groove formed by the machining method, wherein the blind groove has asperities formed on the surface of the blind groove by vibration cutting. By forming the small asperities on the surface of the die, it is possible to provide a molded product having the special effect of the asperities.

As has been discussed, the cutting device of the present invention can perform vibrating cutting using the known three-axis tool unit, thereby simultaneously achieving a shorter machining time, lower machining resistance during cutting, and high-precision machining. Moreover, the cutting device of the present invention can control the absolute position of the cutting edge of the tool with the function of Fast Tool Servo, thereby achieving machining with higher precision.

Further, the machining method of the present invention can simultaneously achieve a shorter machining time, lower machining resistance during cutting, and high-precision machining.

Moreover, by using the machining method of the present invention for die machining, a die surface can be provided with asperities formed by small vibrations on the cutting edge of the tool. The die makes it possible to transfer the small asperities, which have been generated by machining, to a molded product, so that the surface of the molded product hardly varies in brightness with high quality.

DESCRIPTION OF THE EMBODIMENTS

Referring to FIGS. 1 to 17, the following will describe a cutting device, a machining method, and a die machined by the machining method according to embodiments of the present invention.

Figure 1:
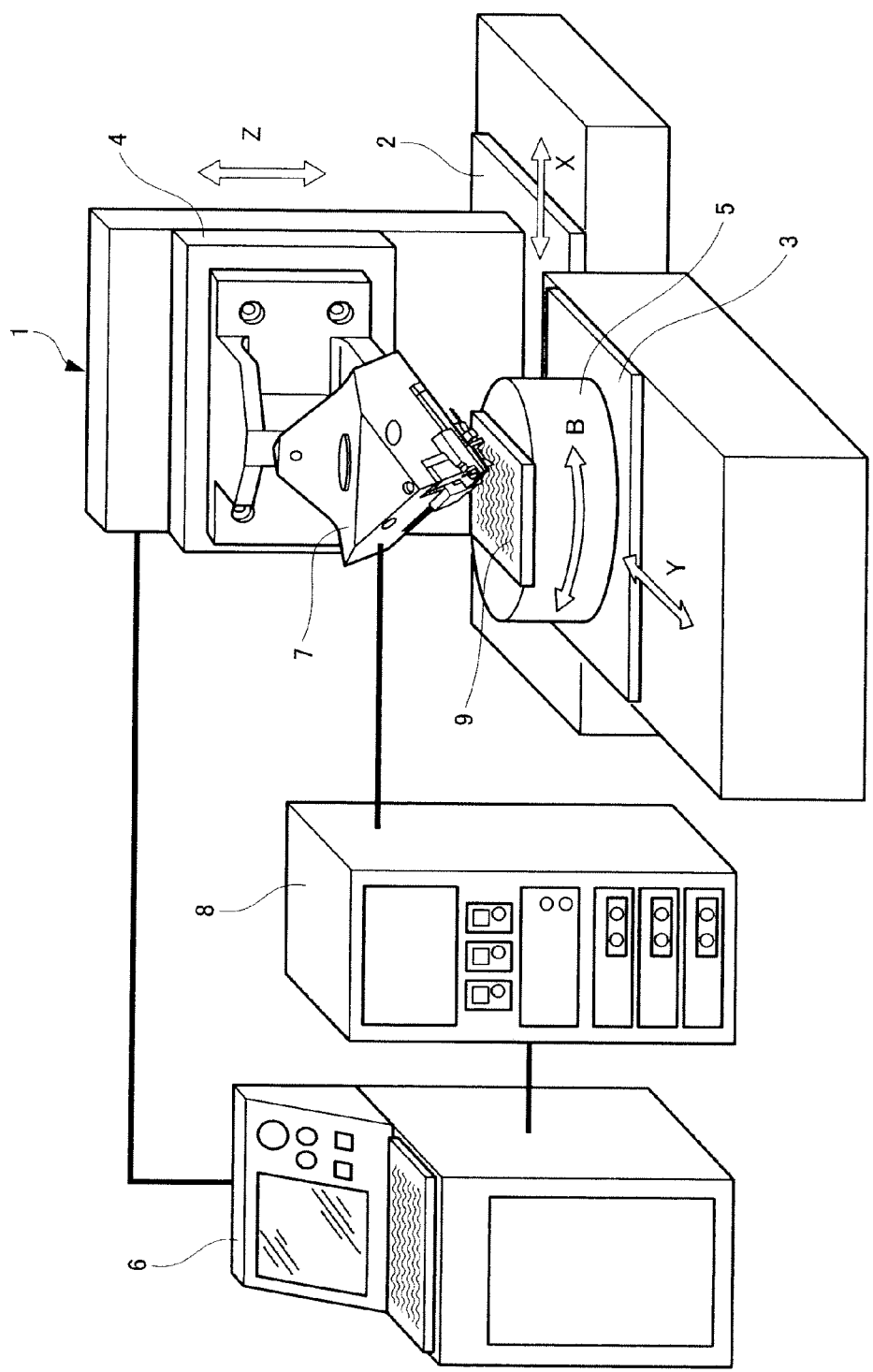
FIG. 1 shows the overall configuration of a cutting device according to an embodiment of the present invention.

FIG. 1 shows the overall-configuration of the cutting device according to the embodiment of the present invention. First, referring to FIG. 1, the following will describe the overall configuration of the cutting device according to the embodiment.

As shown in FIG. 1, the cutting device is made up of an ultraprecision machine 1, a NC controller 6 for controlling the operations of the movable axes of the ultraprecision machine 1 according to a NC program, a three-axis tool unit 7 mounted on the ultraprecision machine 1, and a control box 8 for a three-axis tool unit.

The ultraprecision machine 1 is made up of an X-axis table 2, a Y-axis table 3, and a Z-axis table 4 which are respectively operated in the X-axis, Y-axis, and Z-axis directions orthogonal to one another, and a B-axis table 5 which is mounted on the Y-axis table 3 and rotates about a B axis. A work material 9 is placed on the B-axis table 5. These tables (movable axes) undergo numerical control on the order of nanometers by the NC controller 6.

In the present embodiment, the three-axis tool unit 7 is mounted on the Z-axis table 4 which moves in the X-axis direction in response to the operations of the X-axis table 2. Thus in the present embodiment, the overall three-axis tool unit moves in response to the operations of the X-axis table 2 and the Z-axis table 4.

The control box 8 for the three-axis tool unit and the NC controller 6 for the ultraprecision machine are connected to each other in terms of control. The ultraprecision machine 1 and the three-axis tool unit 7 are simultaneously controlled.

Figure 2:
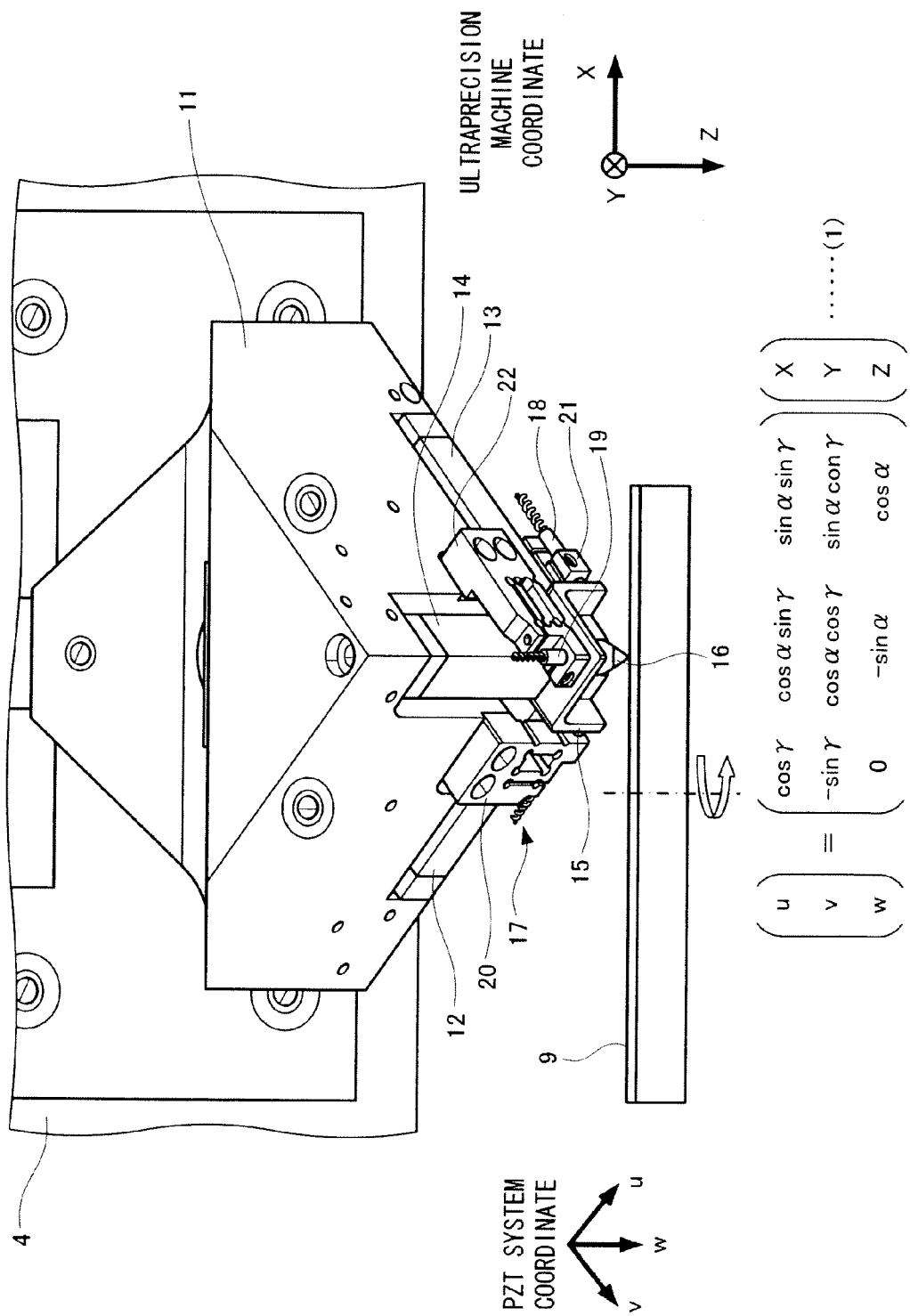
FIG. 2 shows the configuration of a three-axis tool unit according to the embodiment of the present invention.

FIG. 2 shows the configuration of the three-axis tool unit mounted on the ultraprecision machine. A u-axis actuator (first actuator) 12, a v-axis actuator (second actuator) 13, and a w-axis actuator (third actuator) 14, which operate in u-axis, v-axis, and w-axis directions orthogonal to one another, have one ends fixed on a base 11 of the three-axis tool unit via mounting members. The three actuators 12, 13, and 14 are supported so as to be orthogonal to one another.

The three actuators 12, 13, and 14 are preferably made up of piezoelectric elements. The piezoelectric elements can be laminated piezoelectric elements mainly composed of piezoelectric zirconate titanate (PZT). The piezoelectric elements have high response speeds and are suitable for the present invention. In the present embodiment, the actuators are made up of laminated piezoelectric elements mainly composed of PZT. Thus the operations of the actuators are expanding and contracting operations.

The u-axis actuator 12, the v-axis actuator 13, and the w-axis actuator 14 have one end faces fixed on the base 11 and the opposite end faces fixed on a tool holder 15 by bonding. Thus the tool holder 15 is disposed at the intersection of the three axial directions of the u-axis direction, the v-axis direction, and the w-axis direction which are orthogonal to one another. A diamond tool 16 for machining the work material 9 is firmly fixed in the tool holder 15.

A u-axis gap sensor 17, a v-axis gap sensor 18, and a w-axis gap sensor 19 are attached to the base 11 in parallel with the expanding and contracting directions of the u-axis actuator 12, the v-axis actuator 13, and the w-axis actuator 14 via a u-axis sensor holder 20, a v-axis sensor holder 21, and a w-axis sensor holder 22.

The u-axis gap sensor 17, the v-axis gap sensor 18, and the w-axis gap sensor 19 precisely measure the displacements of the end faces (sensor targets) of the tool holder 15 opposed to the gap sensors and generate displacement sensor signals representing the measured displacements. The tool holder 15 is displaced by the expanding and contracting operations of the u-axis actuator 12, the v-axis actuator 13, and the w-axis actuator 14. Thus by measuring the displacements of the end faces of the tool holder 15, the displacements of the u-axis actuator 12, the v-axis actuator 13, and the w-axis actuator 14 can be measured.

In the present embodiment, the gap sensors are capacitance sensors. The gap sensors may be, for example, eddy current sensors or optical fiber sensors.

When the base 11, the u-axis sensor holder 20, the v-axis sensor holder 21, and the w-axis sensor holder 22 are thermally deformed by a change in ambient temperature, an error occurs as if the mounting positions of the u-axis gap sensor 17, the v-axis gap sensor 18, and the w-axis gap sensor 19 were changed, and the error affects the machining accuracy. Thus the base 11, the u-axis sensor holder 20, the v-axis sensor holder 21, and the w-axis sensor holder 22 are desirably composed of low thermal expansion materials such as super invar.

The three actuators 12, 13, and 14 operate (expand and contract) in directions along a coordinate system u-v-w which is different from the coordinate system X-Y-Z of the ultraprecision machine. The expanding and contracting operations of the actuators change the positions of the tool holder 15 and the diamond tool 16 attached to the tool holder 15.

The relationship between the coordinate system of the actuators and the coordinate system of the ultraprecision machine is defined by formula (1) shown in FIG. 2. In the present embodiment, $\alpha$ is 45° and $\gamma$ is about 54.7°. The present invention is not always limited to these angles. In the present embodiment, the coordinate system X-Y-Z of the ultraprecision machine and the coordinate system u-v-w of the actuators are different from each other. The actuators and the ultraprecision machine may have the same coordinate system.

When the u-axis actuator 12, the v-axis actuator 13, and the w-axis actuator 14 are piezoelectric elements, the u-axis actuator 12, the v-axis actuator 13, and the w-axis actuator 14 are expanded and contracted in the u, v, and w axis directions by applying a voltage to the piezoelectric elements to expand and contract the piezoelectric elements. However, since the piezoelectric elements have hysteresis, an amount of expansion/contraction cannot be accurately controlled only by applying, to the piezoelectric elements, a voltage having a value corresponding to a desired amount of expansion/contraction. Thus generally, feedback control is performed based on the displacement sensor signals generated by the u-axis gap sensor 17, the v-axis gap sensor 18, and the w-axis gap sensor 19, thereby achieving characteristics free from hysteresis.

Figure 3:
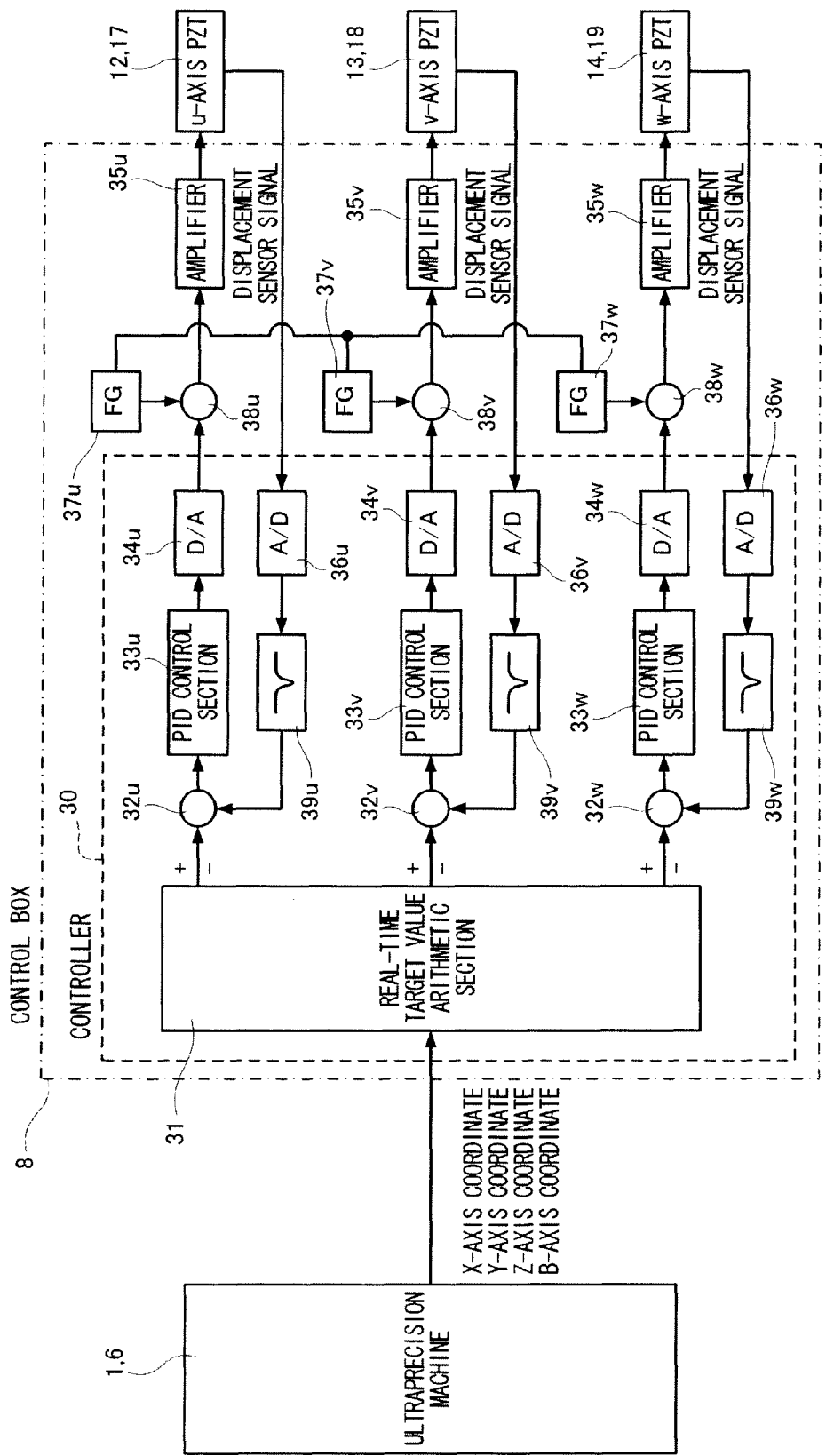
FIG. 3 shows a position control circuit of actuators according to the embodiment of the present invention.

FIG. 3 shows the position control circuit of the actuators according to the present embodiment. First, the basic operations of the position control circuit will be simply described below.

When position information (X-axis coordinate, Y-axis coordinate, Z-axis coordinate, and B-axis coordinate in the present embodiment) from the ultraprecision machine is inputted to a controller 30 provided in the control box 8 of the three-axis tool unit, a real-time target value arithmetic section 31 provided in the controller 30 calculates the target values (command values) of the u-axis actuator 12, the v-axis actuator 13, and the w-axis actuator 14 based on the position information from the ultraprecision machine.

The command values calculated by the real-time target value arithmetic section 31 are transmitted to a u-axis PID control section 33$u$, a v-axis PID control section 33$v$, and a w-axis PID control section 33$w$ via a u-axis adder 32$u$, a v-axis adder 32$v$, and a w-axis adder 32$w$.

The u-axis PID control section 33$u$, the v-axis PID control section 33$v$, and the w-axis PID control section 33$w$ perform proportional plus integral plus derivative actions on the transmitted command values. The command values having undergone the proportional plus integral plus derivative actions are transmitted to a u-axis PZT amplifier 35$u$, a v-axis PZT amplifier 35$v$, and a w-axis PZT amplifier 35$w$ via a u-axis D/A converter 34$u$, a v-axis D/A converter 34$v$, and a w-axis D/A converter 34$w$.

The u-axis PZT amplifier 35$u$, the v-axis PZT amplifier 35$v$, and the w-axis PZT amplifier 35$w$ drive the u-axis actuator 12, the v-axis actuator 13, and the w-axis actuator 14 according to the transmitted command values. The amplifiers may be, for example, bipolar power supplies.

The displacement sensor signals generated by the u-axis gap sensor 17, the v-axis gap sensor 18, and the w-axis gap sensor 19 are fed back to the u-axis adder 32$u$, the v-axis adder 32$v$, and the w-axis adder 32$w$, respectively via a u-axis A/D converter 36$u$, a v-axis A/D converter 36$v$, and a w-axis A/D converter 36$w$. The u-axis adder 32$u$, the v-axis adder 32$v$, and the w-axis adder 32$w$ calculate deviations between the command values calculated by the real-time target value arithmetic section 31 and the fed back amounts of extraction/contraction (displacements) of the actuators. The deviations calculated by the u-axis adder 32$u$, the v-axis adder 32$v$, and the w-axis adder 32$w$ are transmitted to the u-axis PID control section 33$u$, the v-axis PID control section 33$v$, and the w-axis PID control section 33$w$, respectively.

In this way, the operations of the u-axis actuator 12, the v-axis actuator 13, and the w-axis actuator 14 independently undergo feedback control based on the command values calculated by the real-time target value arithmetic section 31 and the displacement sensor signals fed back from the u-axis gap sensor 17, the v-axis gap sensor 18, and the w-axis gap sensor 19.

In the present embodiment, the u-axis actuator 12, the v-axis actuator 13, and the w-axis actuator 14 are vibrated such that elliptical vibration cutting is performed on the work material by the tool of the three-axis tool unit. For elliptical vibration cutting, it is necessary to vibrate the actuators like sinusoidal waves and synchronize the vibrations.

In the present embodiment, a u-axis arbitrary waveform generator 37$u$, a v-axis arbitrary waveform generator 37$v$, and a w-axis arbitrary waveform generator 37$w$ are provided in the control box 8 as three arbitrary waveform generators which generate sinusoidal vibration waveform values to independently vibrate the u-axis actuator 12, the v-axis actuator 13, and the w-axis actuator 14. Further, a u-axis adder 38$u$, a v-axis adder 38$v$, and a w-axis adder 38$w$ are provided before the u-axis PZT amplifier 35$u$, the v-axis PZT amplifier 35$v$, and the w-axis PZT amplifier 35$w$ as arbitrary waveform input devices which are fed with the vibration waveform values generated by the u-axis arbitrary waveform generator 37$u$, the v-axis arbitrary waveform generator 37$v$, and the w-axis arbitrary waveform generator 37$w$. The u-axis adder 38$u$, the v-axis adder 38$v$, and the w-axis adder 38$w$ add the waveform values generated by the u-axis arbitrary waveform generator 37$u$, the v-axis arbitrary waveform generator 37$v$, and the w-axis arbitrary waveform generator 37$w$ to the command values transmitted to the u-axis PZT amplifier 35$u$, the v-axis PZT amplifier 35$v$, and the w-axis PZT amplifier 35$w$.

The u-axis arbitrary waveform generator 37$u$, the v-axis arbitrary waveform generator 37$v$, and the w-axis arbitrary waveform generator 37$w$ are connected to one another in terms of control and are simultaneously controlled. The u-axis arbitrary waveform generator 37$u$, the v-axis arbitrary waveform generator 37$v$, and the w-axis arbitrary waveform generator 37$w$ generate predetermined voltage values having predetermined phase differences and waveforms having predetermined numbers of vibrations.

With this configuration, the u-axis actuator 12, the v-axis actuator 13, and the w-axis actuator 14 are vibrated like sinusoidal waves and the vibrations can be synchronized.

The displacement sensor signals from the u-axis gap sensor 17, the v-axis gap sensor 18, the w-axis gap sensor 19 include the vibration components of the u-axis actuator 12, the v-axis actuator 13, and the w-axis actuator 14. When the vibration components are directly fed back, the vibrations are controlled to be suppressed.

Thus in the present embodiment, a u-axis notch filter 39u, a v-axis notch filter 39v, and a w-axis notch filter 39w are inserted into the feedback systems of the u axis, the v axis, and the w axis to prevent the suppression of the vibrations of the actuators.

For example, when the basic number of vibrations is 1500 Hz in elliptical vibration cutting, notch filters rapidly attenuating at 1500 Hz are inserted. The insertion of the notch filters does not cause problems in machining because disturbance factors other than 1500 Hz undergo feedback control.

Figure 4:
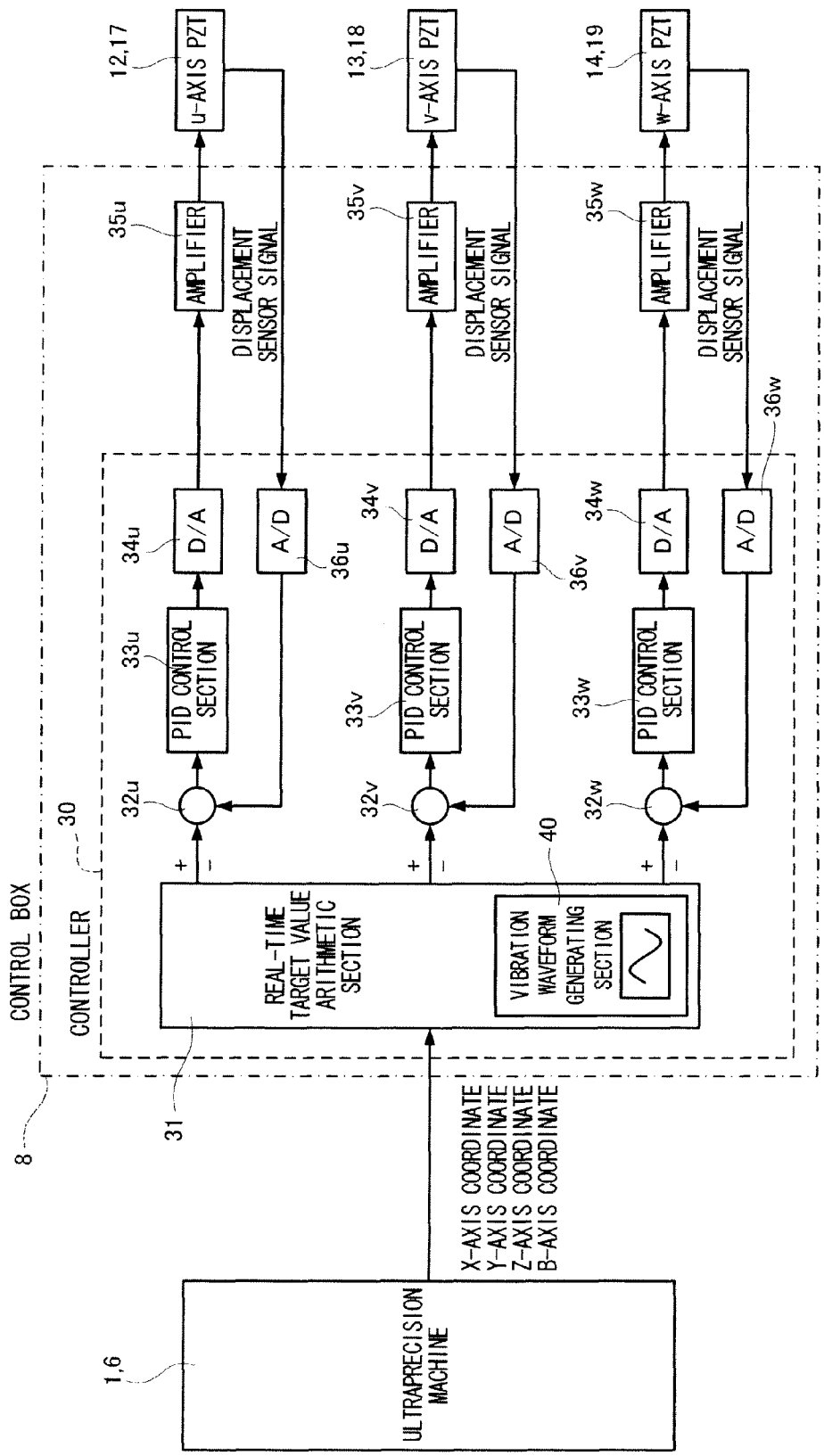
FIG. 4 shows a position control circuit of actuators according to another embodiment of the present invention.

The following will describe a position control circuit of actuators according to another embodiment of the present invention. FIG. 4 shows the position control circuit of the actuators according to this embodiment of the present invention. In FIG. 4, members corresponding to the members of FIG. 3 are indicated by the same reference numerals. Regarding the position control circuit of FIG. 4, the following will discuss different points from the position control circuit of FIG. 3.

In the position control circuit of FIG. 3, the arbitrary waveform generators provided outside the controller 30 vibrate the actuators, whereas in the position control circuit of FIG. 4, vibration waveforms are generated in a controller 30.

To be specific, a real-time target value arithmetic section 31 includes a vibration waveform generating section 40 which generates sinusoidal vibration waveform values for independently vibrating a u-axis actuator 12, a v-axis actuator 13, and a w-axis actuator 14.

The real-time target value arithmetic section 31 adds the vibration waveform values generated by the vibration waveform generating section 40 to command values, and transmits the command values to which the vibration waveform values have been added. The vibration waveform generating section 40 generates, as vibration waveforms for axes, predetermined voltage values having predetermined phase differences and waveforms having predetermined numbers of vibrations.

Referring to FIGS. 5A, 5B, 5C, 6, and 7, the operations of the actuators of a three-axis tool unit will be described below. In these drawings, the vertical axes of graphs represent the output values (voltage [V]) of gap sensors and the horizontal axes represent phases [deg].

In the present embodiment, the motion axes (X-Y-Z axes) of tables of an ultraprecision machine and the operation axes (u-v-w axes) of the actuators are different from each other. In this case, the way to control vibrations in the traveling direction of a tool is important.

Figure 5A:
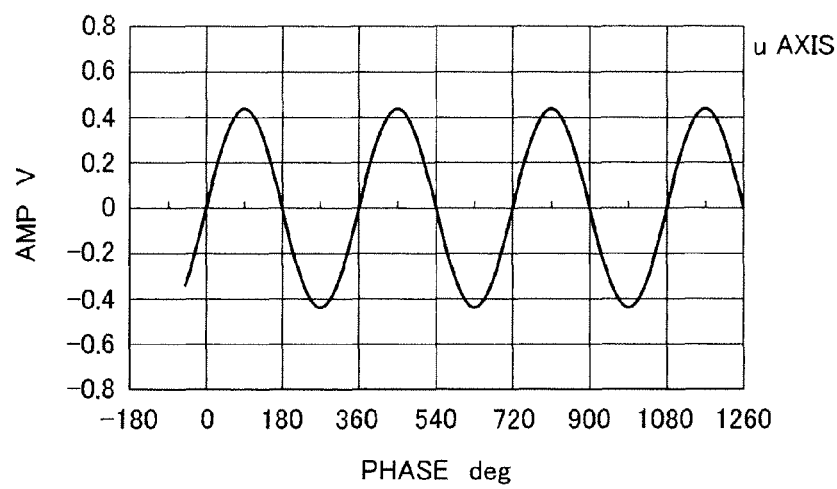
FIGS. 5A, 5B, and 5C show vibrations in the u-v-w axis directions of the u-axis actuator, the v-axis actuator, and the w-axis actuator.
Figure 5B:
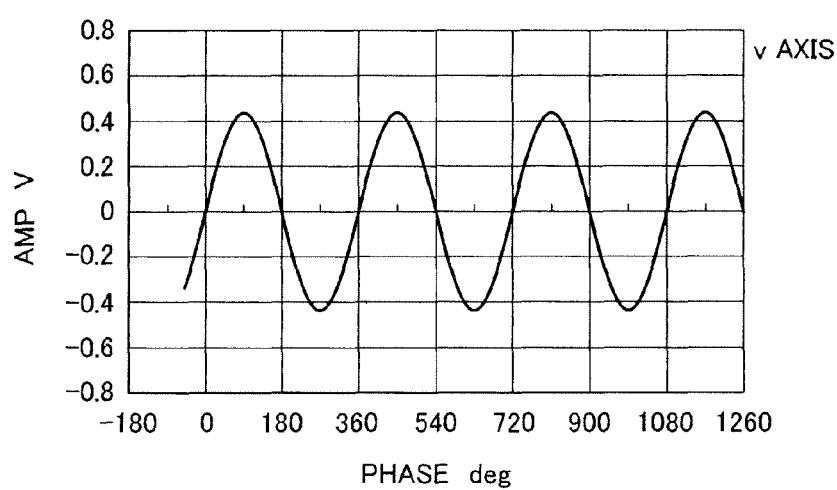
Figure 5C:
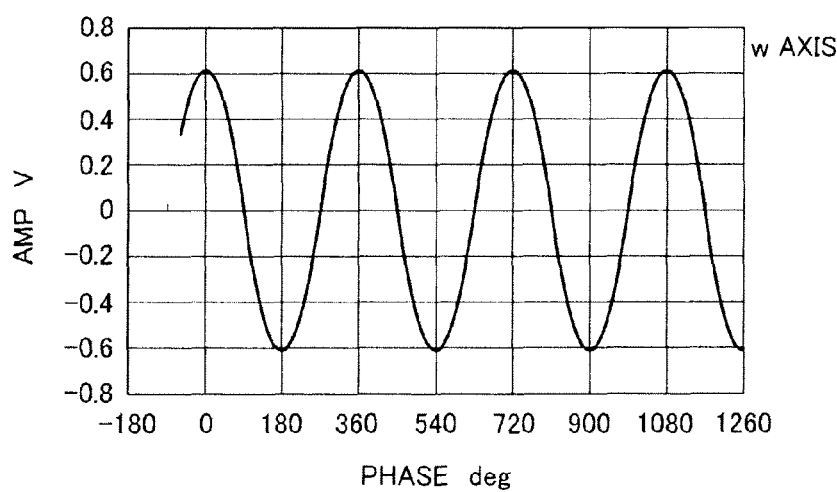

FIG. 5A shows the vibrations of the u-axis actuator 12 in the u-axis direction, FIG. 5B shows the vibrations of the v-axis actuator 13 in the v-axis direction, and FIG. 5C shows the vibrations of the w-axis actuator 14 in the w-axis direction. To be specific, in FIGS. 5A to 5C, the u-axis actuator 12 and the v-axis actuator 13 vibrate at an operating frequency of 1500 Hz and a displacement of about ±0.2 micrometers, and the w axis actuator 14 vibrates at an operating frequency of 1500 Hz and a displacement of about ±0.25 micrometers.

Figure 6:
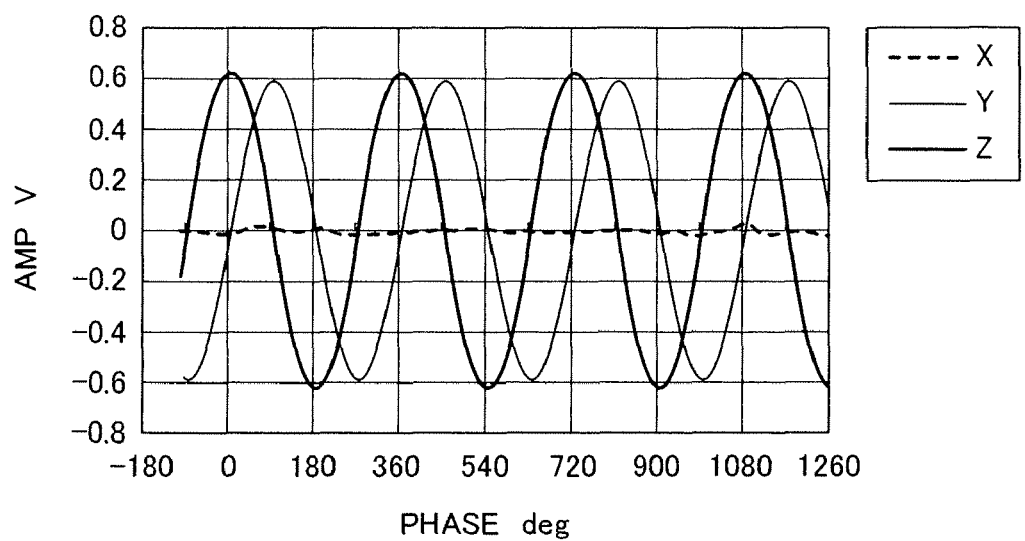
FIG. 6 shows a result of coordinate transformation of the vibrations of the u-axis actuator, the v-axis actuator, and the w-axis actuator in the u-v-w axis directions to vibrations in the X-Y-Z axis directions of an ultraprecision machine.

FIG. 6 shows a result of coordinate transformation of the vibrations of the u-axis actuator, the v-axis actuator, and the w-axis actuator in the u-v-w axis directions in FIGS. 5A, 5B, and 5C to vibrations in the X-Y-Z axis directions of the ultraprecision machine. In FIG. 6, a broken line represents a vibrating operation in the X-axis direction, a thin solid line represents a vibrating operation in the Y-axis direction, and a thick solid line represents a vibrating operation in the Z-axis direction.

The actuators vibrated as shown in FIGS. 5A to 5C have amplitudes of about ±0.25 micrometers in the Y-axis direction and the Z-axis direction and an amplitude of substantially 0 in the X-axis direction when viewed from the X-Y-Z axes of the ultraprecision machine.

Figure 7:
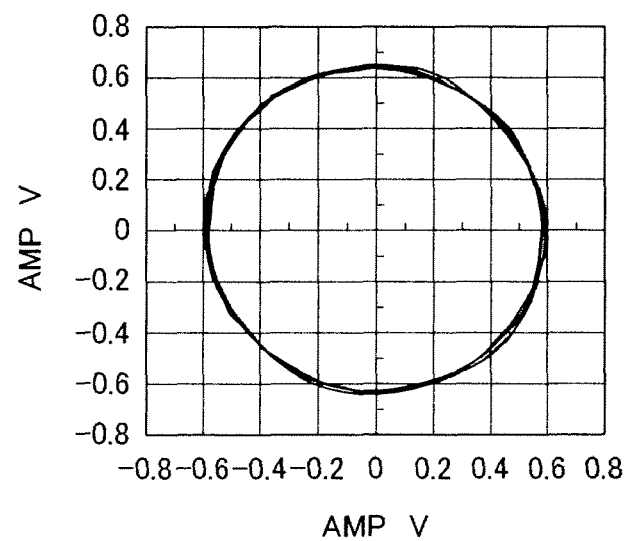
FIG. 7 shows the Lissajous waveforms of Y and Z axes shown in FIG. 6.

FIG. 7 shows the Lissajous waveforms of the Y and Z axes shown in FIG. 6. In this example, the tool vibrates along a circle of ±2.5 micrometers in the Y-Z plane.

Figure 8A:
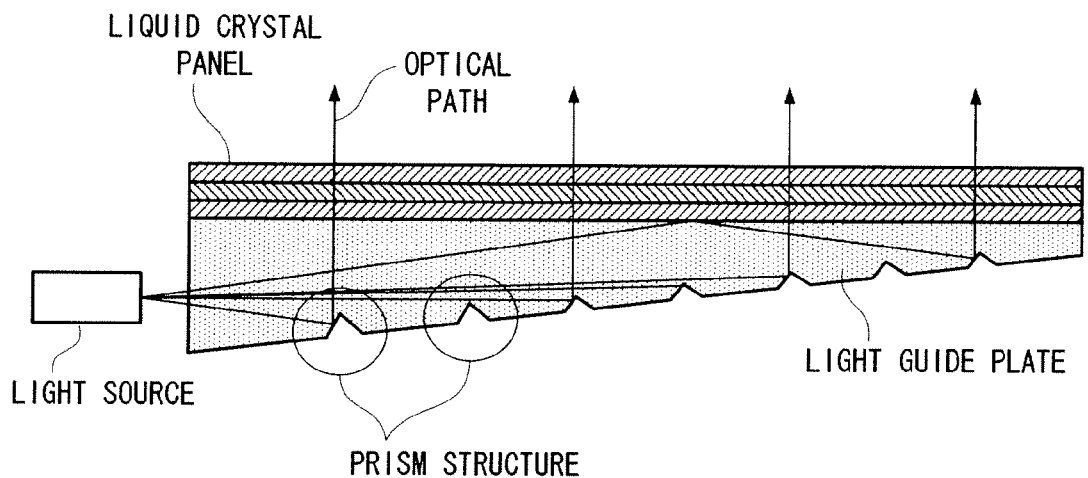
FIG. 8A shows the configuration of a liquid crystal display.

The following will describe an example of a machined product. FIG. 8A shows the sectional configuration of a liquid crystal display. The liquid crystal display is mainly made up of a liquid crystal panel and a light source section. The light source section is made up of a light source and a light guide plate. The light source may be a cold-cathode tube, an LED, and so on. The light guide plate is a component for bending light from the light source and irradiating the liquid crystal panel with the light from the back. The light guide plate is made of resin. The light guide plate is mainly formed by injection molding using a die. Various kinds of configurations are available for the light guide plate. For example, as shown in FIG. 8A, a light guide plate has extremely small prism structures. The prism structures bend, as shown in FIG. 8A, light from the light source and irradiate the liquid crystal panel with the light from the back. The quality of the structures determines the quality of the liquid crystal display.

Figure 8B:
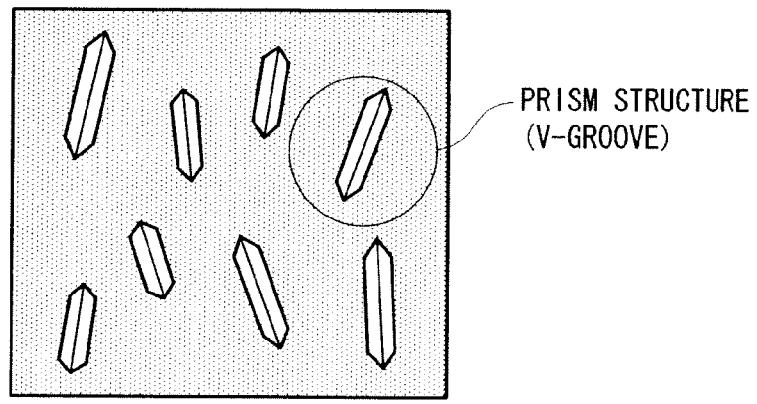
FIG. 8B is a schematic diagram showing an example of a prism structure of a light guide plate.

FIG. 8B is a schematic diagram showing an example of the prism structure of the light guide plate. The prism structure of the light guide plate completely varies among optical designs and the present invention is not limited to the structures of FIG. 8B. In the present embodiment, the light guide plate is fabricated with the prism structures, each having a length of about 1 μm to 500 μm, a width of about 10 μm, and a cross section shaped like a V-groove (blind groove) in the width direction. As shown in FIG. 8B, the prism structures completely vary in angle and length from place to place.

The light guide plate is formed by resin molding. Thus the die of the light guide plate has a shape reversed from the shapes of the prism structures, that is, the die has convex portions V-shaped in cross section along the width direction. However, it is difficult to directly machine the convex portions V-shaped in cross section, so that the die of the light guide plate is generally fabricated as follows:

First, a mold master is fabricated which has the same blind grooves (hereinafter, will be referred to as V-grooves) as the resin light guide plate to be fabricated as a product (molded product). Next, the reversed shape (a plate having convex portions V-shaped in cross section) is formed by nickel electroforming using the mold master. The plate fabricated by nickel electroforming is used as a resin molding die.

According to the foregoing method, even when the plate serving as a resin molding die is damaged, the plate can be duplicated from the mold master. Thus this method is frequently used in the industry.

In the present embodiment, the mold master of the light guide plate is fabricated by machining a work material.

For example, on the mold master of a light guide plate for a 2.2-inch liquid crystal display, about 250000 V-grooves are formed. These 250000 V-grooves have to be machined such that variations in depth are 1 μm or less in view of error analysis in optical design. Further, considering roughness on the inclined surfaces of the V-grooves, optical mirror surfaces are necessary because light has to be reflected. Thus when the mold master of the light guide plate is machined, the 250000 V-grooves have to be formed with extremely high precision. In the case of a large liquid crystal display, the number of prism structures increases with the area of the liquid crystal panel.

Figure 9A:
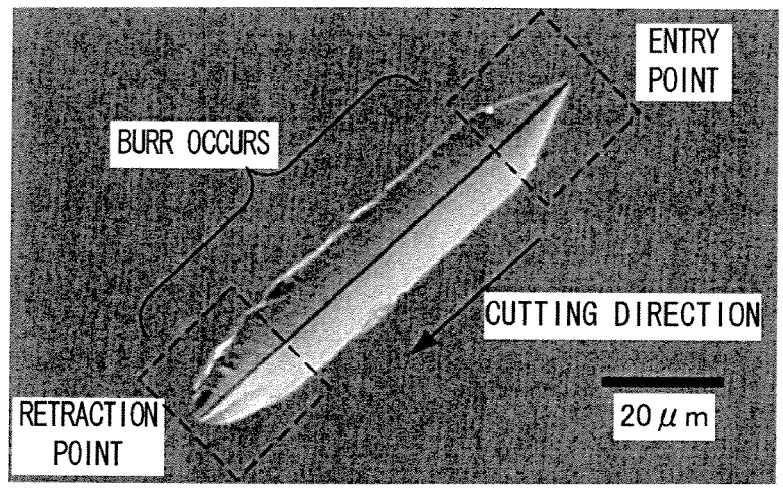
FIG. 9A shows a picture of an example of a machining result of a V-groove having been formed by a typical cutting device.
Figure 9B:
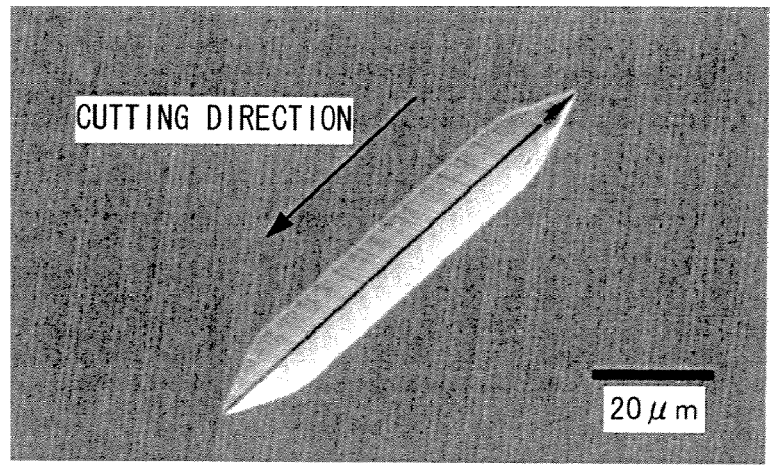
FIG. 9B shows a picture of an example of a machining result of a V-groove having been formed by the cutting device according to the embodiment of the present invention.

FIG. 9A shows an example of a machining result of the V-groove having been formed by a typical cutting device. FIG. 9B shows an example of a machining result of the V-groove having been formed by the cutting device of the present embodiment. To be specific, FIG. 9B shows the V-groove having undergone elliptical vibration cutting in which the actuators of the three-axis tool unit are vibrated at 1500 Hz. The V-groove is formed by cutting a flat work material.

As shown in FIGS. 9A and 9B, each V-groove has a tool entry point and a tool retraction point. As shown in FIGS. 9A and 9B, a burr (flash) occurs on a side of the V-groove having been formed by the typical cutting device, whereas the cutting device of the present embodiment can form the sharp V-groove without causing any burrs.

Elliptical vibration cutting can achieve substantially a higher machining speed in addition to high-precision machining obtained by a generally known "lifting effect of chipping".

In other words, FIGS. 9A and 9B show the V-grooves having been formed by rotating the work material at a rotation speed of 60 mm per minute. In this case, the cutting speed is 60 mm/min. In elliptical vibration cutting, a cutting edge is rotated at high speeds. When the actuators are vibrated at 1500 Hz as in the present example, the peripheral speed of the cutting edge reaches no less than 1400 mm/min. Thus the substantial machining speed of elliptical vibration cutting is higher than the machining speed of ordinary cutting. The 100-um V-grooves of FIGS. 9A and 9B can be cut at high speeds only by elliptical vibration cutting. Further, elliptical vibration cutting can shorten the machining time and achieve high-precision machining.

Figure 10A:
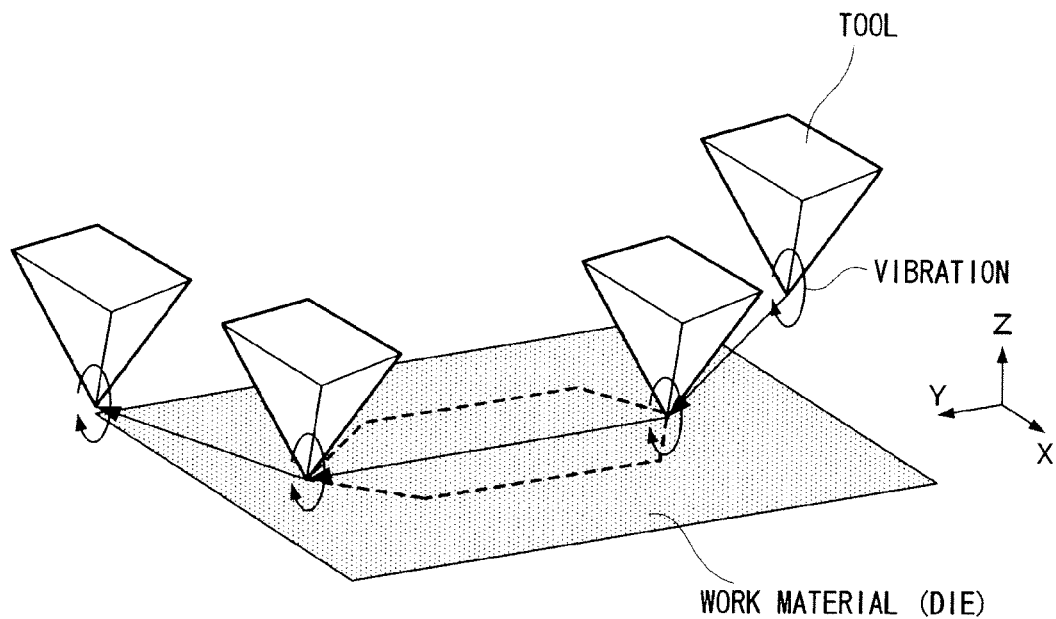
FIGS. 10A and 10B are schematic views for explaining the operations of a tool during the machining of the V-groove according to the embodiment of the present invention.
Figure 10B:
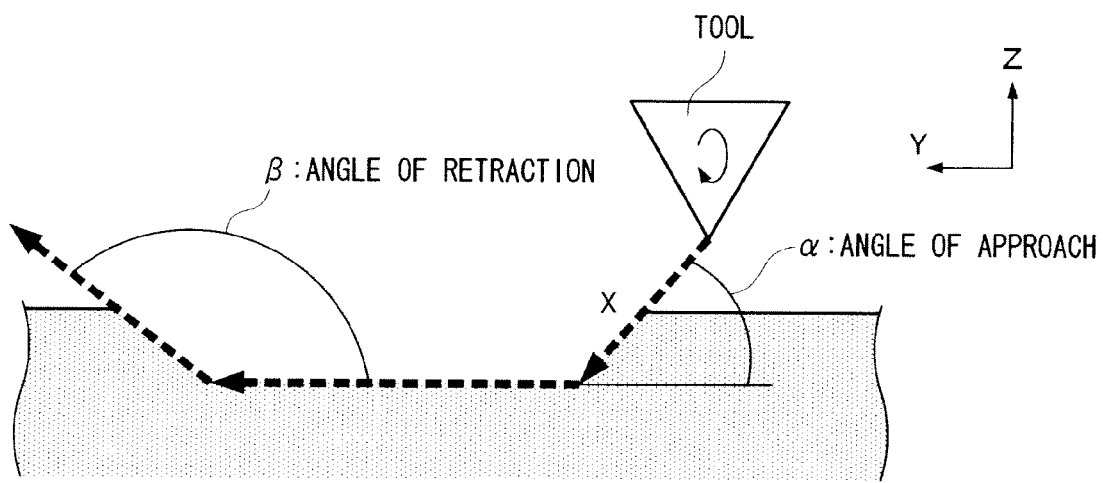

The following will describe an example of a machining method of the V-groove. FIGS. 10A and 10B are schematic views for explaining the operations of the tool during the machining of the V-groove. As shown in FIG. 10A, in the present embodiment, the tool is caused to travel in the Y-axis direction while drawing an elliptical vibration path in the Y-Z plane. As shown in FIG. 10B, when the tool enters the work material, the tool is caused to travel so as to enter the work material from diagonally above. In other words, the tool has an angle of approach of $0°<\alpha<90°$. When the tool retracts from the work material, the tool is caused to travel so as to retract diagonally upward. In other words, the tool has an angle of retraction of $90°<\beta<180°$. As has been discussed, the tool entering the work material is caused to travel diagonally below relative to the traveling direction, and the tool is caused to travel diagonally upward at the terminal end of the V-groove. Thus it is possible to reduce fluctuations in the operating speeds of the movable axes of the ultraprecision machine, thereby achieving high-speed machining with the maximum efficiency. In the present embodiment, the angle of approach is 45° and the angle of retraction is 135°.

In the case where the tool has an angle of approach of 90°, that is, in the case where the tool is caused to enter in the Z direction, it is necessary to change the traveling direction of the tool to the Y direction when the cutting edge of the tool reaches the bottom of the V-groove. By rapidly changing the traveling direction of the tool, the average speed of the tool is reduced because of acceleration and deceleration, thereby increasing the machining time. In an experiment, when an angle of approach $\alpha$ and an angle of retraction $\beta$ were both 90°, the average machining time for machining a V-groove was increased by 0.2 seconds. When the 250000 V-grooves are machined, the machining time is increased by about 14 hours. Thus in order to shorten the machining time, the angle of approach $\alpha$ has to be 0° to 90° and the angle of retraction $\beta$ has to be 90° to 180°.

In order to achieve short-time machining on the large number of V-grooves which are oriented in any directions as shown in FIG. 8B, the NC program is constructed such that one of the V-grooves is machined and then the closest V-groove to be subsequently machined is machined, in consideration of a travel time from the machined V-groove to the V-groove to be subsequently machined. Thus when the tool is moved from the machined V-groove to the V-groove to be subsequently machined, the X axis, the Y axis, and the B axis may be operated or all of the four axes including the Z axis may be operated.

Figure 11:
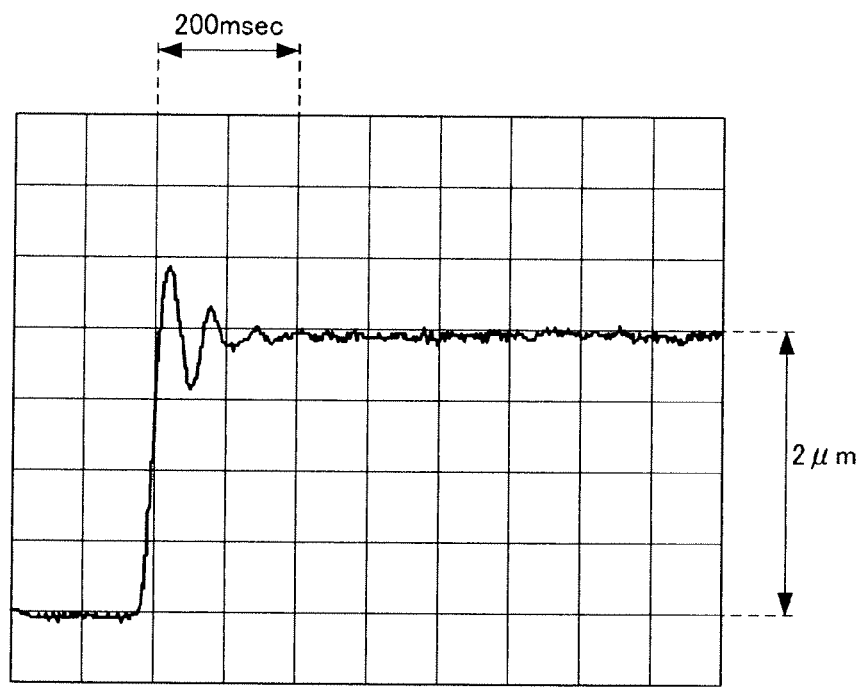
FIG. 11 shows an example of a behavior immediately after the movable axes of the ultraprecision machine are positioned.

FIG. 11 shows an example of a behavior immediately after the movable axes (tables) of the ultraprecision machine are positioned. FIG. 11 shows a behavior when a step operation is performed only on the X axis. To be specific, FIG. 11 shows a behavior when a step operation is performed on the X axis only by 2 µm. As shown in FIG. 11, after the completion of positioning, the tables vibrate even after a lapse of 200 milliseconds. When machining is performed in the event of such vibrations, the V-grooves meander and burrs occur at the entry points of the V-grooves. Further, when a settling time is set from when positioning is completed to when the vibrations of the tables subside, the machining time for machining the 250000 V-grooves increases. For example, the setting time of 200 milliseconds increases the machining time by about 14 hours. As has been discussed, the four axes are simultaneously operated at a maximum during a movement from the machined V-groove to the V-groove to be subsequently machined, so that the machining time may further increase.

Figure 12:
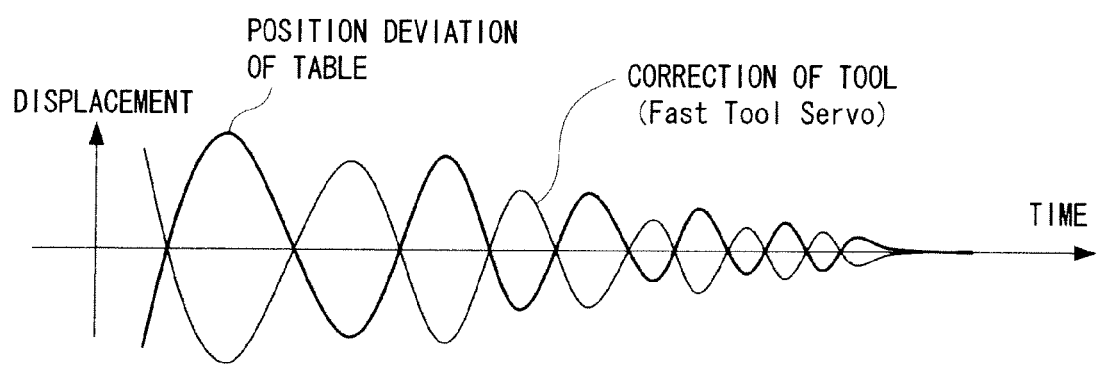
FIG. 12 is a conceptual drawing showing position correction on the cutting edge of the tool.

The cutting device of the present embodiment performs position correction in which the cutting edge of the tool is controlled to a predetermined position so as to compensate for a positioning error (a displacement from the predetermined position of the cutting edge of the tool) of the cutting edge of the tool, the positioning error being caused by the deviations of the movable axes (tables) immediately after the positioning operation of the ultraprecision machine. FIG. 12 is a conceptual drawing showing the position correction on the cutting edge of the tool according to the present embodiment. After the tables of the ultraprecision machine are positioned, even in the event of position deviations caused by vibrations of the tables as shown in FIG. 12, the actuators of the three-axis tool unit mounted in the ultraprecision machine are driven such that the cutting edge of the tool is corrected only by the position deviations of the tables in the opposite directions from the tables. Thus it is possible to compensate for changes (displacements) of the relative positions of the tool and the work material. The position correction on the cutting edge of the tool can be realized by the position correcting function of Fast Tool Servo. Machining with position correction makes it possible to cut the V-grooves with high precision without increasing the machining time.

Figure 13:
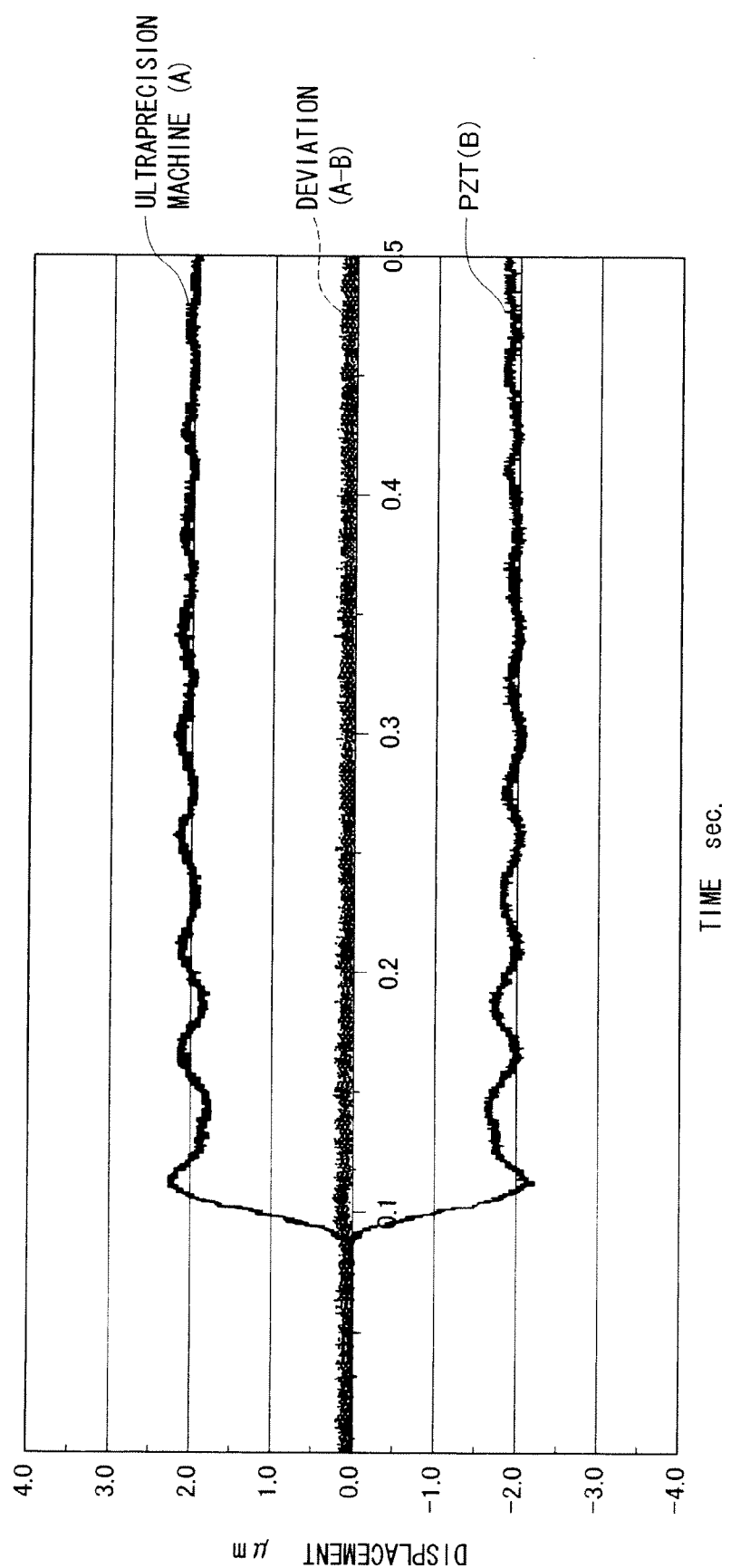
FIG. 13 shows an example of position correction on the cutting edge of the tool relative to a deviation occurring on the X axis.

FIG. 13 shows an example of position correction on the cutting edge of the tool. To be specific, FIG. 13 shows position correction when a step operation is performed only on the X axis of the ultraprecision machine only by 2 µm. As shown in FIG. 13, the X-axis table and the actuators (tool) are operated in completely opposite directions. A difference between the operations of the X-axis table and the tool is 0.1 µm or less, which achieves sufficient accuracy in the machining of the V-grooves on the mold master of the light guide plate.

The movable axes of the ultraprecision machine have deviations not only on linear driving axes such as the X axis, the Y axis, and the Z axis but also on a rotation axis such as the B axis. In the case of the prism structures shown in FIG. 8, the B axis serving as a rotation axis has to be driven in machining. With the cutting device of the present embodiment, it is possible to compensate for a deviation (angle error) occurring on the rotation axis in a similar manner to a deviation occurring on the linear driving axis. Since the absolute value of a positioning error in the plane of rotation increases with a distance from the center of rotation, it is important to correct an angle error occurring on the rotation axis.

Figure 14:
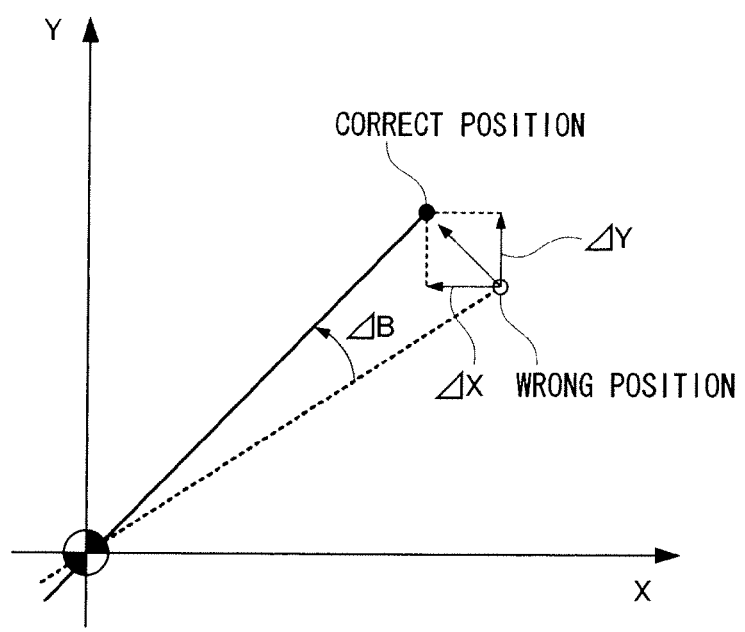
FIG. 14 is an explanatory drawing of position correction on the cutting edge of the tool relative to a deviation occurring on a rotation axis.

As shown in FIG. 14, a deviation occurring on the rotation axis can be compensated by dispersing an angle error to the linear axes in the plane of rotation. For example, in the event of an angle error of $\Delta B$, the error is dispersed in the plane of rotation and the position of the tool is moved in the X axis direction by $\Delta X$ and in the Y axis direction by $\Delta Y$, so that the error can be corrected. Thus with the cutting device of the present embodiment, an angle error can be also corrected.

Figure 15A:
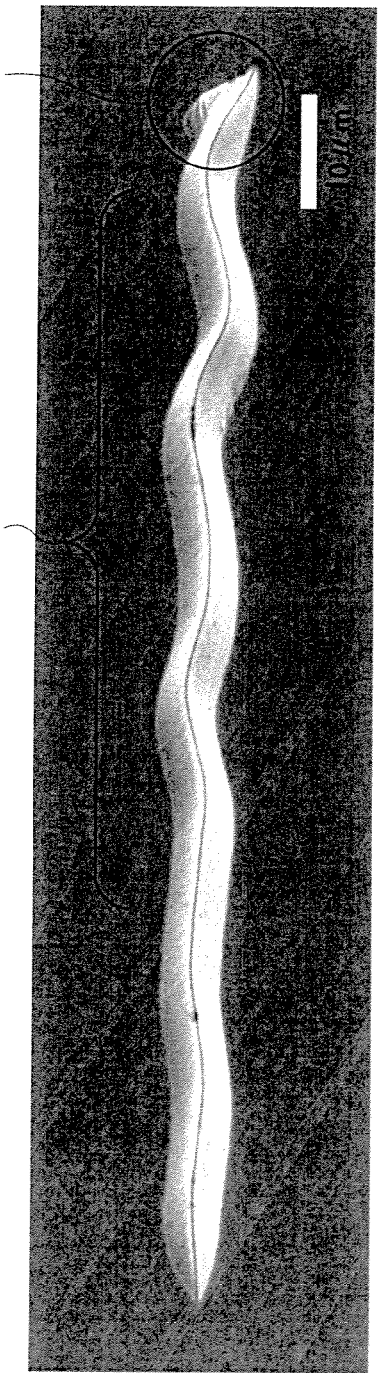
FIG. 15A shows a picture of an example of a machining result obtained by performing elliptical vibration cutting without correcting a position.
Figure 15B:
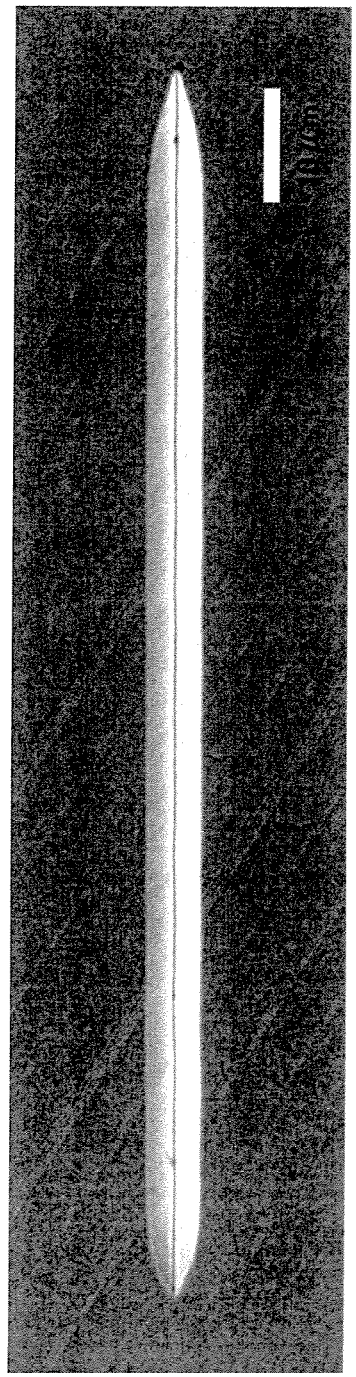
FIG. 15B shows a picture of an example of a machining result obtained by performing elliptical vibration cutting while correcting a position.

FIG. 15A shows an example of a machining result obtained by performing elliptical vibration cutting without correcting a position by the position correcting function of Fast Tool Servo. FIG. 15B shows an example of a machining result obtained by performing elliptical vibration cutting while correcting a position by the position correcting function of Fast Tool Servo.

As shown in FIG. 15A, when a position is not corrected, a large burr occurs at the tool entry point and the entire groove considerably meanders. Thus when the large number of V-grooves are successively machined in a short time, high machining accuracy cannot be obtained only by elliptical vibration cutting.

On the other hand, as shown in FIG. 15B, elliptical vibration cutting performed with position correction does not cause burrs at the tool entry point and the overall V-groove does not meander, so that the V-groove is not defective in appearance. The machining results prove that position correction performed by Fast Tool Servo with elliptical vibration cutting is quite effective for performing high-precision machining in a short time.

Figure 16:
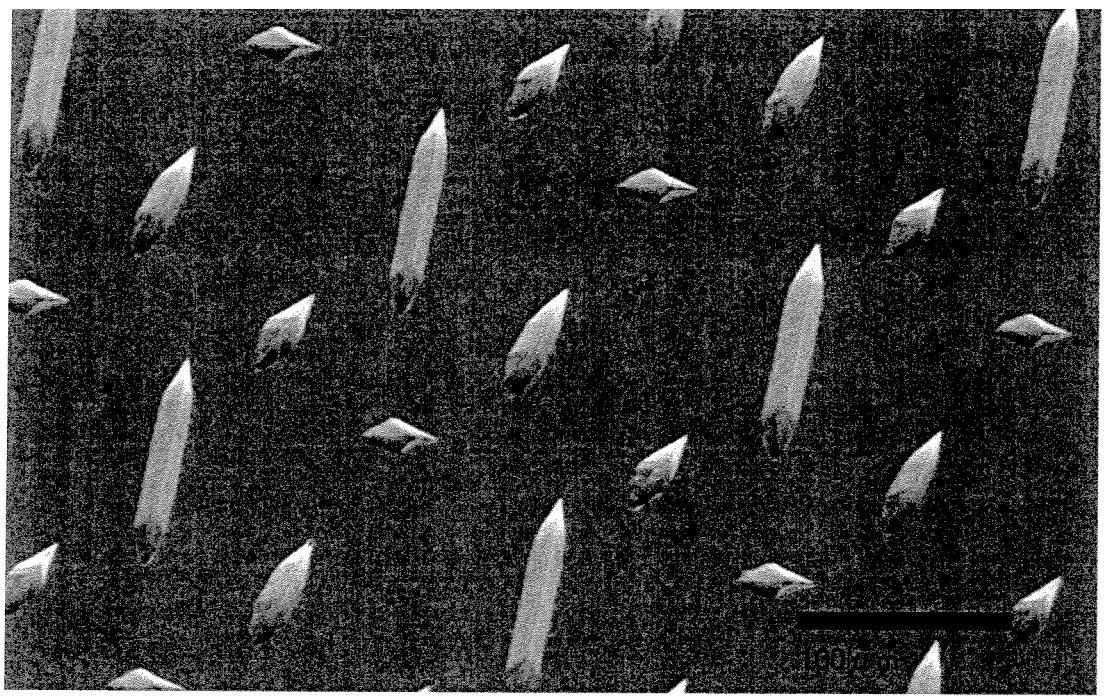
FIG. 16 shows a picture of an example of a machining result of the V-grooves on the mold master of the light guide plate.

FIG. 16 shows an example of a machining result of the V-grooves on the mold master of the light guide plate. In this example, the number of machined V-grooves was about 250000 and the average machining time of the V-groove was 0.33 seconds. In the average machining time, about 0.1 seconds were used for machining the V-groove and 0.23 seconds were used for a movement from the machined V-groove to the V-groove to be subsequently machined. The total time for machining all the 250000 V-grooves is about 23 hours (0.33 seconds×250000).

High-precision machining can be performed thus in a short time because the settling time after the movable axes of the ultraprecision machine are positioned can be shorted by performing machining while compensating for the deviations of the movable axes of the ultraprecision machine with the position correcting function of Fast Tool Servo. Without compensating for the deviations of the movable axes, the machining time increases and even the machining accuracy decreases.

As has been discussed, when the large number of V-grooves are successively machined in a short time only by elliptical vibration cutting, an excellent machining result cannot be obtained. In order to machine the large number of V-grooves with high precision only by elliptical vibration cutting, it is necessary to increase the settling time of the movable axes of the ultraprecision machine or reduce the travelling speeds of the movable axes. In either case, machining cannot be performed in a short time. Further, an increase in machining time changes a machining atmosphere, for example, a temperature, so that the V-grooves vary in depth. For this reason, in order to machine the large number of V-grooves with high accuracy, the machining time has to be reduced at the same time.

Figure 17A:
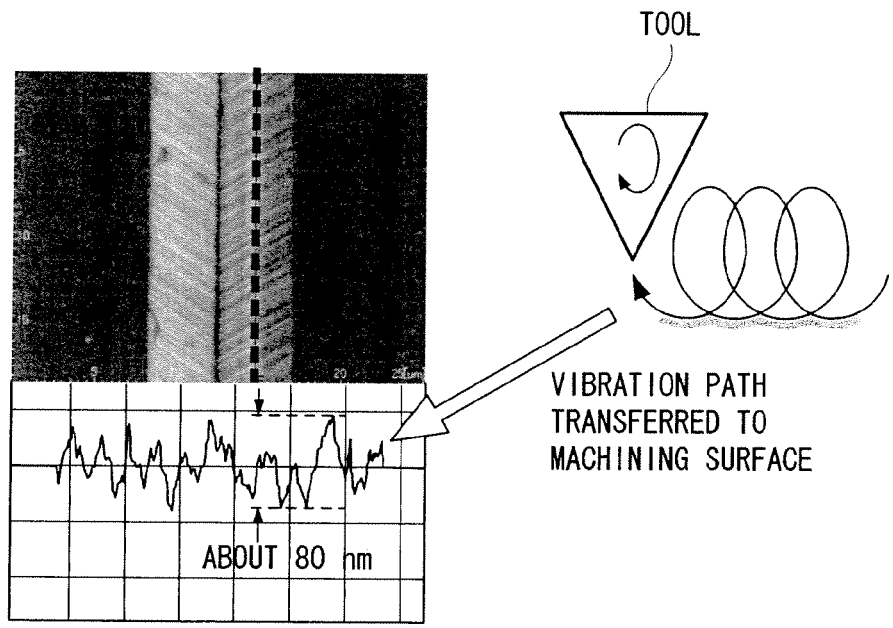
FIG. 17A shows an example of roughness on the inclined surfaces of the V-groove on the mold master.

Next, the following will describe the light guide plate fabricated using the mold master on which the V-grooves are formed by the cutting device of the present embodiment. FIG. 17A shows an example of roughness on the inclined surfaces of the V-groove on the mold master. As shown in FIG. 17A, regular roughness is generated on the inclined surfaces of the V-groove by transferring the elliptical vibration path of the cutting edge of the tool. The regular roughness is effective for the following reasons:

The prism structures of the light guide plate require, as has been discussed, the function of reflecting light emitted from the light source. When viewed from the light crystal panel, it looks like as if the respective prism structures of the light guide plate illuminate like bright spots. These bright spots cause uneven brightness at some viewing angles, resulting in undesirable results for the characteristics of the light guide plate.

Figure 17B:
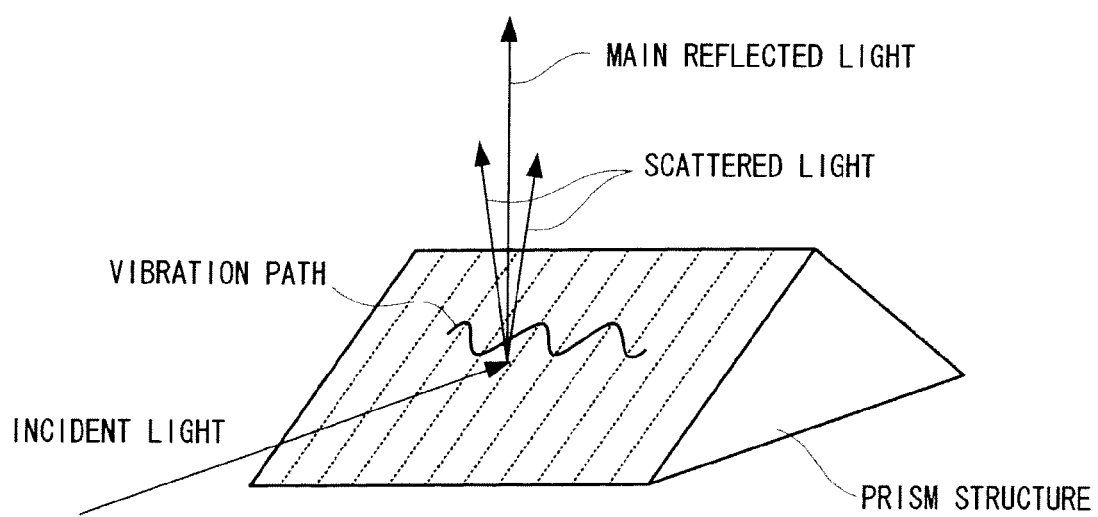
FIG. 17B is an explanatory drawing of the effect of an elliptical vibration path having been transferred to the reflecting surface of the prism structure.
Figure 18:
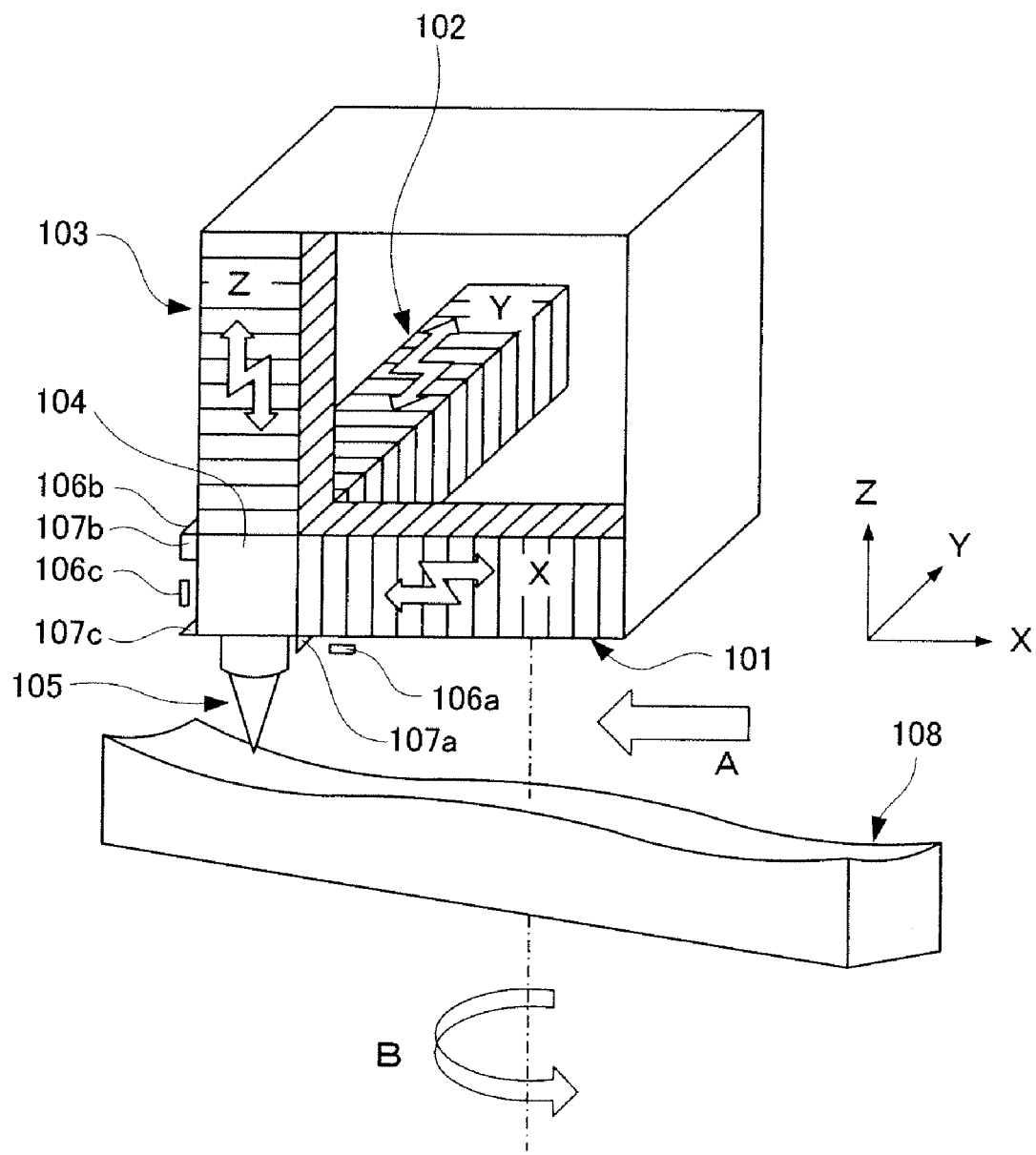
FIG. 18 is a typical structural diagram showing a cutting device for realizing Fast Tool Servo.
Figure 19:
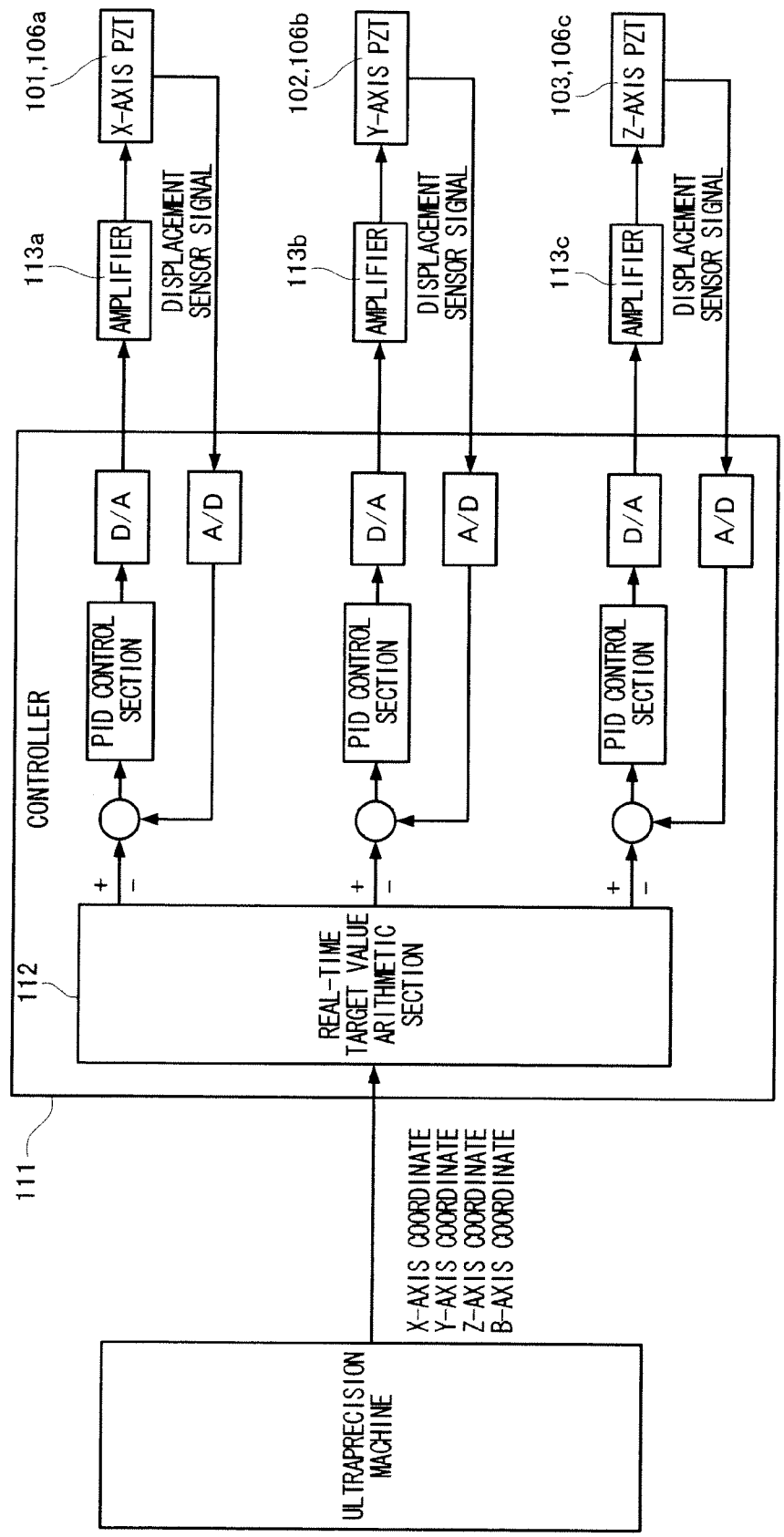
FIG. 19 is a typical control block diagram of the cutting device for realizing Fast Tool Servo.

The elliptical vibration path of the cutting edge of the tool is also transferred to the reflecting surfaces of the prism structures of the light guide plate fabricated using the mold master on which the V-grooves are formed by the cutting device of the present embodiment. FIG. 17B shows the effect of the elliptical vibration path having been transferred to the reflecting surface of the prism structure (V-groove). As shown in FIG. 17B, small asperities (elliptical vibration path) on the reflecting surface of the prism structure slightly scatter light around main reflected light. The scattered light eliminates defects such as the foregoing uneven brightness, achieving high-quality characteristics for the light guide plate.

Effective asperities formed by the vibration path are about one fifth to one twenty fifth as large as a used wavelength. Such small roughness can prevent uneven brightness on the light guide plate without considerably degrading the function of reflecting the light of the prism structure.

The present embodiment described an example of the machining of linear grooves. The present invention is also applicable to the machining of curved grooves. Further, the present embodiment described an example of the machining of grooves V-shaped in cross section along the width direction. The present invention is applicable to any shapes in cross section. Moreover, the present invention is applied not only to the machining of grooves but also to the machining of a mathematically defined continuous surface such as a freeform surface or the machining of a discontinuity surface.

The cutting device of the present invention can perform machining with precision on the order of nanometers in a short time. The cutting device of the present invention can be used for machining optical devices in general. Particularly, the cutting device of the present invention can perform machining in complicated shapes including diffraction gratings, with high precision in a short time.

The cutting device of the present invention is also applicable to die machining in which a number of repeated shapes are necessary on a display and the like.

What is claimed is:

1. A cutting device comprising:
a movable three-axis tool unit comprising:
a first actuator for vibrating in a u direction;
a second actuator for vibrating in a v direction orthogonal to the u direction;
a third actuator for vibrating in a w direction orthogonal to the u direction and to the v direction;
a tool holder located at an intersection of the u direction, the v direction, and the w direction;
a tool mounted in the tool holder, and protruding from the tool holder in a direction different from the u direction, the v direction, and the w direction, the tool for vibrating to perform vibration cutting on a work material by vibration of the first, second, and third actuators in the u direction, the v direction, and the w direction, respectively; and three sensors for measuring displacements of the first, second, and third actuators, respectively, and for feeding back displacement signals representing the measured displacements; tables located along three orthogonal axes and for moving the three-axis tool unit relative to a work material in three directions along said three orthogonal axes, said three directions each being different from the u direction, the v direction, and the w direction, respectively; and a waveform generating section comprising: three arbitrary waveform generators which are simultaneously controlled and are for generating waveforms for independently vibrating the first, second, and third actuators, an arithmetic section for generating command values representing target values for displacement of the first, second, and third actuators, respectively, an adding section for adding the generated waveform values to the command values, whereby the first, second, and third actuators independently undergo feedback control based on the command values and displacement signals fed back from the three sensors during vibration of the first, second, and third actuators, the first, second, and third actuators for vibrating the tool to perform vibration cutting on a work material.

2. The cutting device according to claim 1, further comprising: three arbitrary waveform input devices between the arithmetic section and the first, second, and third actuators, respectively, and are fed with the waveforms generated by the three arbitrary waveform generators.

3. The cutting device according to claim 2, further comprising three amplifiers for driving the first, second, and third actuators, respectively,
wherein the three arbitrary waveform input devices are located before the three amplifiers.

4. The cutting device according to claim 2, further comprising three notch filters respectively located in feedback systems to which the displacement signals are fed back from the three sensors.

5. The cutting device according to claim 1, wherein the arithmetic section comprises: the waveform generating section and the adding section.

6. The cutting device according to claim 1, wherein the arithmetic section is for generating command values for the first, second, and third actuators to compensate for a displacement of a cutting edge of the tool from a predetermined position, the displacement being caused by deviations of the tables in the three directions of the three orthogonal axes of the tables.

7. The cutting device according to claim 1, wherein the actuators are for vibrating the tool to perform elliptical vibration cutting on a work material.

8. The cutting device according to claim 1, wherein the three sensors are for measuring displacements of end faces of the tool holder, respectively.

9. The cutting device according to claim 1, for vibrating the tool at a frequency of vibration higher than frequencies of the feedback control of each of the first, second and third actuators.

10. A method of machining a work material by vibrating a tool to perform vibration cutting on the work material and moving a three-axis tool unit containing the tool along tables located along three orthogonal axes, relative to the work material in three directions of the three orthogonal axes, the method comprising: vibrating three actuators in u, v, and w directions, respectively, the three actuators provided on the three-axis tool unit and the u, v and w directions each being different from the three directions of the three orthogonal axes of the tables, respectively, thereby vibrating the tool to perform vibration cutting on the work material, the tool protruding from a tool holder toward a direction different from the u, v, and w directions and the tool holder located at an intersection of the u, v, and w directions on the three-axis tool unit, while during vibrating of the tool, a position of a cutting edge of the tool undergoes feedback control, generating command values representing target values for independent displacement of each of the first, second, and third actuators, generating waveform values for independently vibrating the first, second, and third actuators, and adding the generated waveform values to the command values, whereby each of the first, second, and third actuators independently undergoes feedback control based on the command values and measured displacement of the first, second, and third actuators.

11. The machining method according to claim 10, wherein when machining a work material, a blind groove is formed on the work material by causing the tool to enter the work material and then retracting the tool from the work material.

12. The machining method according to claim 11, wherein the tool enters the work material at an angle smaller than 90 degrees and the tool retracts from the work material at an angle larger than 90 degrees.

13. Forming a die having a blind groove by the machining method according to claim 11, wherein the blind groove has asperities on a surface of the blind groove formed by vibration cutting.

* * * * *